United States Patent
Park et al.

(10) Patent No.: US 8,411,801 B2
(45) Date of Patent: Apr. 2, 2013

(54) APPARATUS AND METHOD FOR ESTIMATING INVERSE CHANNEL OF REPEATER'S RECEIVING CHANNEL

(75) Inventors: Sung-Ik Park, Daejon (KR); Heung-Mook Kim, Daejon (KR); So-Ra Park, Daejon (KR); Yong-Tae Lee, Daejon (KR); Jong-Soo Lim, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 377 days.

(21) Appl. No.: 12/676,883

(22) PCT Filed: May 6, 2008

(86) PCT No.: PCT/KR2008/002534
§ 371 (c)(1),
(2), (4) Date: Aug. 5, 2010

(87) PCT Pub. No.: WO2009/031746
PCT Pub. Date: Mar. 12, 2009

(65) Prior Publication Data
US 2010/0310023 A1 Dec. 9, 2010

(30) Foreign Application Priority Data
Sep. 7, 2007 (KR) .................. 10-2007-0091034

(51) Int. Cl.
*H04L 27/06* (2006.01)
*H04B 1/10* (2006.01)
(52) U.S. Cl. ....................... 375/340; 375/350
(58) Field of Classification Search .......... 375/232, 375/260, 340, 350; 370/208, 210
See application file for complete search history.

(56) References Cited

U.S. PATENT DOCUMENTS 3,466,547 A 9/1969 Flanagan et al.
4,896,285 A 1/1990 Ishikawa et al.
(Continued)

FOREIGN PATENT DOCUMENTS

JP S63-246914 A 10/1988
JP H06-062282 A 3/1994
(Continued)

OTHER PUBLICATIONS

Mazzenga, F. "Channel Estimation and Equalization for M-QAM Transmission with a Hidden Pilot Sequence." IEEE Transactions on Broadcasting, vol. 46, No. 2 (Jun. 2000): pp. 170-176.

(Continued)

*Primary Examiner* — Don N Vo
(74) *Attorney, Agent, or Firm* — Rabin & Berdo, P.C.

(57) ABSTRACT

Provided is an apparatus and method for estimating inverse channel of a repeater's receiving channel, which ensures stability and causality by generating a time-domain filter coefficient having information on an inverse channel of repeater's receiving channel from a signal transmitted from a main transmitter or another repeater. The apparatus includes: a channel estimator for estimating a channel established by a transmission path from a received signal; an inverse minimum phase filter coefficient generator for generating inverse channel of a minimum phase channel from the estimated channel, and converting the inverse channel of the minimum phase channel into a time-domain filter coefficient; an inverse group delay filter coefficient generator for generating a time-domain filter coefficient by using the estimated channel and the minimum phase channel; and a combiner for generating an inverse channel of a receiving channel in a time domain by combining the filter coefficient and the filter coefficient.

12 Claims, 5 Drawing Sheets

U.S. PATENT DOCUMENTS

| | | |
|---|---|---|
| 5,282,154 A | 1/1994 | Knutson et al. |
| 2002/0041642 A1 | 4/2002 | Bonhomme |
| 2004/0125235 A1* | 7/2004 | Kim et al. .................... 348/607 |
| 2006/0176802 A1* | 8/2006 | Ko et al. ........................ 370/208 |
| 2007/0058081 A1* | 3/2007 | Kim et al. .................... 348/607 |
| 2007/0183602 A1 | 8/2007 | Takahashi et al. |
| 2009/0129257 A1* | 5/2009 | Maltsev et al. ............... 370/208 |

FOREIGN PATENT DOCUMENTS

| | | |
|---|---|---|
| JP | 2002-057605 A | 2/2002 |
| KR | 2004-0078088 A | 9/2004 |
| KR | 2005-0025754 A | 3/2005 |
| KR | 2006-0112586 A | 11/2006 |
| KR | 2007-0075175 A | 7/2007 |
| WO | WO-2006/115320 A1 | 11/2006 |

OTHER PUBLICATIONS

Yong-Tae Lee et al., "A Design of Equalization Digital On-Channel Repeater for Single Frequency Network ATSC System", IEEE Transactions on Broadcasting, vol. 53, No. 1, pp. 23-37, Mar. 2007.

* cited by examiner

○ : Zero
× : Pole

○ : Zero
× : Pole

APPARATUS AND METHOD FOR ESTIMATING INVERSE CHANNEL OF REPEATER'S RECEIVING CHANNEL

TECHNICAL FIELD

The present invention relates to an apparatus and method for estimating an inverse channel of a repeater's receiving channel; and, more particularly, to an apparatus and method for estimating an inverse channel of a repeater's receiving channel, which is capable of ensuring stability and causality by generating a time-domain filter coefficient having information on an inverse channel of a repeater's receiving channel from a signal transmitted from a main transmitter or other repeater.

This work was supported by the IT R&D program of MIC/IITA 12007-S-006-01, "Development of On-Channel RF repeating technology based on OFDM modulation".

BACKGROUND ART

A repeater is installed in an area where a signal from a main transmitter is received at a weak level, and it can solve an unstable reception and broaden a coverage area of the main transmitter.

Generally, channel distortion occurs between the main transmitter and the repeater. The repeater compensates for the distortion of a receiving channel between the main transmitter and the repeater and retransmits the compensated signal. To this end, the repeater estimates a receiving channel, generates a time-domain filter coefficient having information on an inverse channel of the estimated receiving channel, and compensates for the distortion of the receiving channel by filtering a received signal using the generated filter coefficient.

A conventional method for estimating an inverse channel of a repeater's receiving channel will be described below with reference to FIG. 1.

Referring to FIG. 1, an inverse channel ($H_{INV}$) 12 is generated from an estimated receiving channel (H) 11 by a direct inverse transformation using division, which is expressed as the following Equation 1:

MathFigure 1

$$H_{INV} = [H_{INV}(0) H_{INV}(1) \ldots H_{INV}(N-1)]^T \quad [\text{Math. 1}]$$
$$= \left[\frac{1}{H(0)} \frac{1}{H(1)} \ldots \frac{1}{H(N-1)}\right]^T$$

where N represents the number of samples of the estimated channel, and T represents a transpose.

The inverse transformation using division can ensure stability and causality when z-plane's poles and zeros of the estimated receiving channel are located inside the unit circle as illustrated in FIG. 2.

However, in the real environment, a part of the z-plane's poles and zeros of the estimated receiving channel are located outside the unit circle as illustrated in FIG. 3. Therefore, in the real environment, the channel estimation using division cannot ensure stability and causality.

DISCLOSURE OF INVENTION

Technical Problem

An embodiment of the present invention is directed to providing an apparatus and method for estimating an inverse channel of a repeater's receiving channel, which are capable of solving a problem that has not ensured stability and causality because z-plane's poles and zeros of an estimated receiving channel are located outside the unit circle.

Another embodiment of the present invention is directed to providing an apparatus and method for estimating an inverse channel of a repeater's receiving channel, which are capable of ensuring stability and causality by estimating a channel established by a transmission path between a transmitter and a repeater from a signal transmitted with a known signal such as a pilot signal or a training sequence being inserted, and generating a time-domain filter coefficient having information on an inverse channel of a repeater's receiving channel from the estimated channel.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for estimating an inverse channel, the apparatus including: a channel estimator for estimating a channel established by a transmission path from a received signal with a known signal being inserted; an inverse minimum phase filter coefficient generator for generating an inverse channel of a minimum phase channel from the channel estimated by the channel estimator, and converting the inverse channel of the minimum phase channel into a time-domain filter coefficient; an inverse group delay filter coefficient generator for generating a time-domain filter coefficient having an inverse group delay component by using the estimated channel and the minimum phase channel; and a combiner for generating an inverse channel of a receiving channel in a time domain by combining the filter coefficient converted from the inverse minimum phase filter coefficient generator and the filter coefficient generated from the inverse group delay filter coefficient generator.

In accordance with another aspect of the present invention, there is provided a method for estimating an inverse channel, the method including: estimating a channel established by a transmission path from a received signal with a known signal being inserted; generating an inverse channel of a minimum phase channel from the estimated channel, and converting the inverse channel of the minimum phase channel into a time-domain filter coefficient; generating a time-domain filter coefficient having an inverse group delay component by using the estimated channel and the minimum phase channel; and generating an inverse channel of a receiving channel in a time domain by combining the converted filter coefficient and the generated filter coefficient.

Advantageous Effects

According to the present invention, stability and causality can be ensured by estimating a channel established by a transmission path between a transmitter and a repeater from a signal transmitted with a known signal such as a pilot signal or a training sequence being inserted, and generating a time-domain filter coefficient having information on an inverse channel of a repeater's receiving channel from the estimated channel.

BEST MODE FOR CARRYING OUT THE INVENTION

The advantages, features and aspects of the invention will become apparent from the following description of the embodiments with reference to the accompanying drawings, which is set forth hereinafter.

Figure 1:
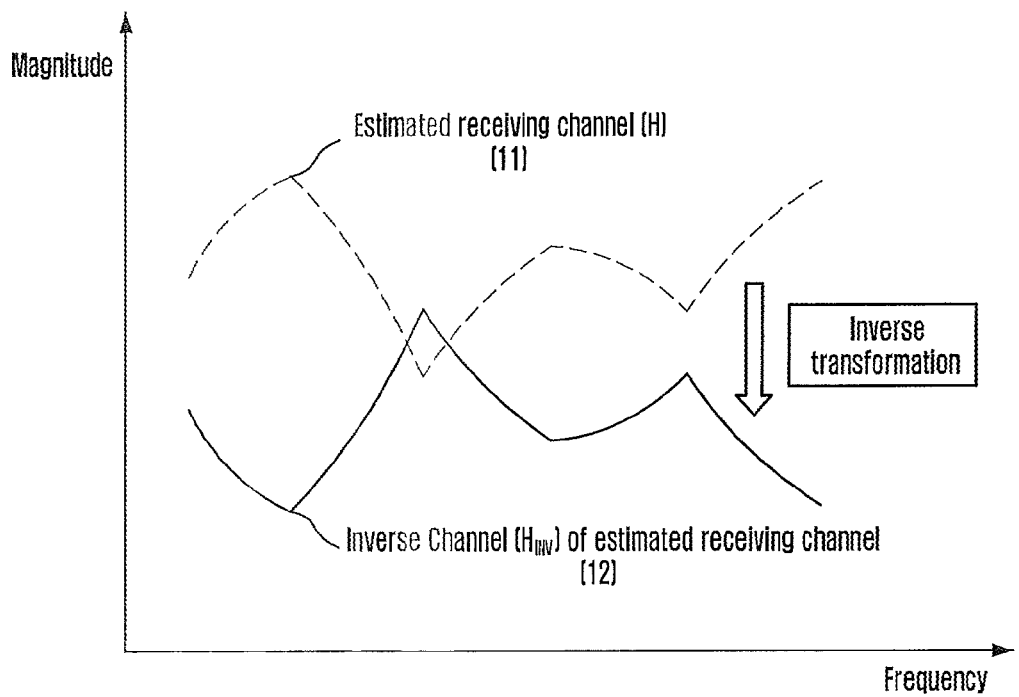
FIG. 1 is a graph illustrating a repeater's receiving channel and its inverse channel in the frequency domain.
Figure 2:
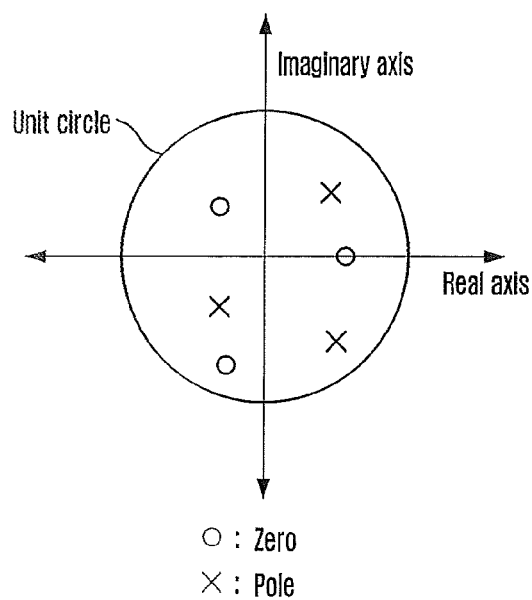
FIG. 2 is a graph illustrating z-plane's poles and zeros of the repeater's receiving channel, which are located inside the unit circle.
Figure 3:
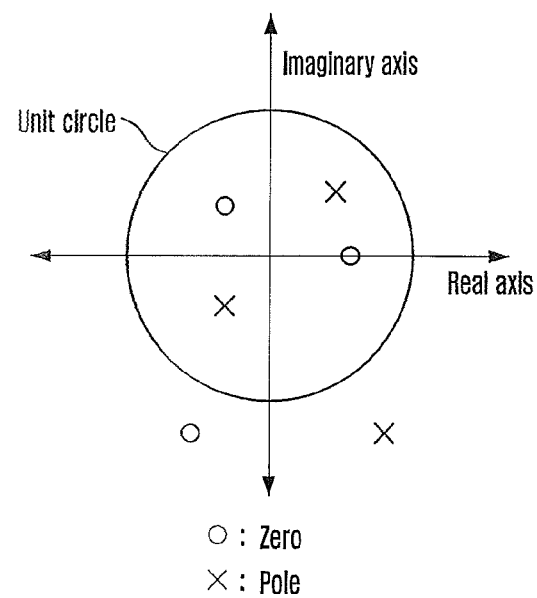
FIG. 3 is a graph illustrating z-plane's poles and zeros of the repeater's receiving channel, which are located outside the unit circle.
Figure 4:
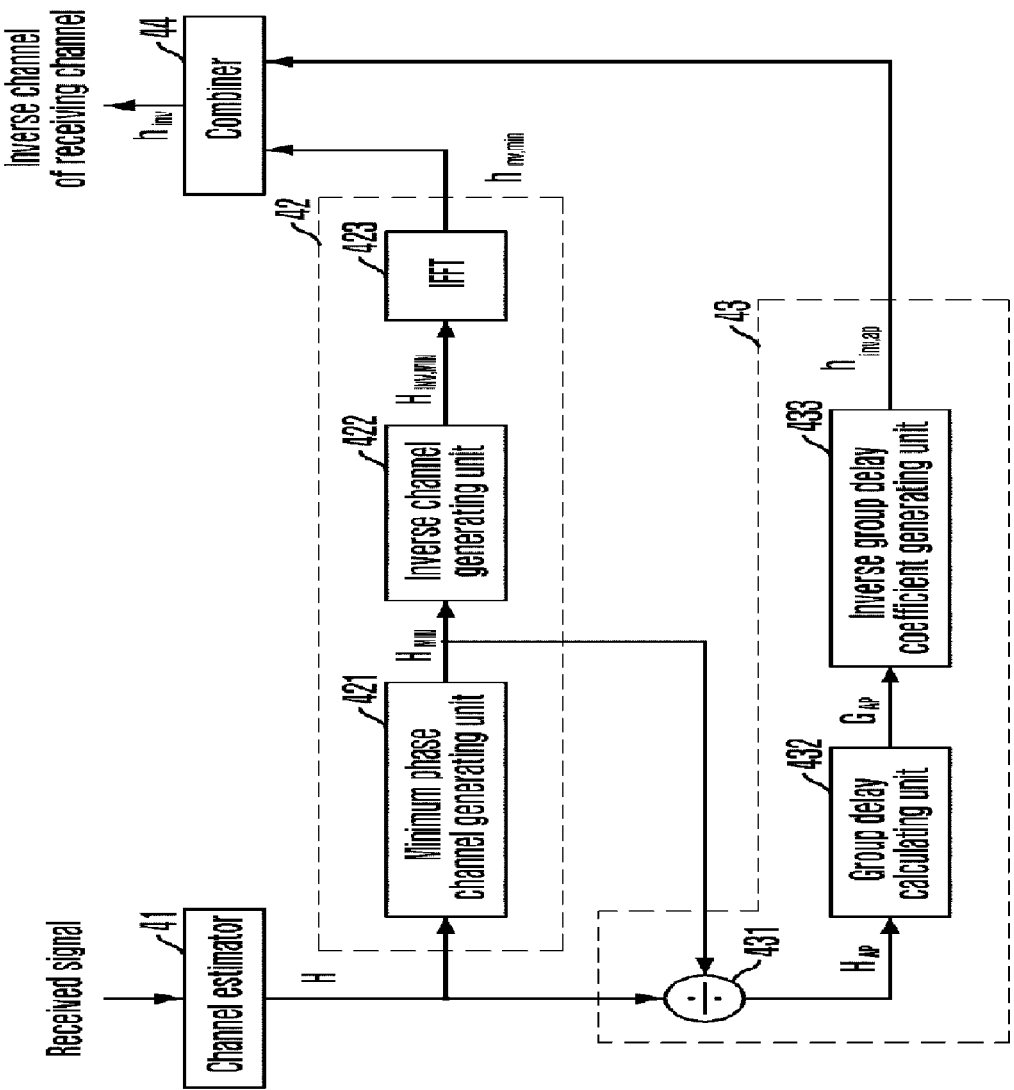
FIG. 4 is a block diagram showing an apparatus for estimating an inverse channel of a repeater's receiving channel in accordance with an embodiment of the present invention.

FIG. 4 is a block diagram illustrating an apparatus for estimating an inverse channel of a repeater's receiving channel in accordance with an embodiment of the present invention.

Referring to FIG. 4, the apparatus includes a channel estimator 41, an inverse minimum phase filter coefficient generator 42, an inverse group delay filter coefficient generator 43, and a combiner 44. The channel estimator 41 estimates a channel H established by a transmission path between a transmitter and a repeater from a signal transmitted with a known signal such as a pilot signal or a training sequence being inserted.

The inverse minimum phase filter coefficient generator 42 generates an inverse channel $H_{INV,MIN}$ of a minimum phase channel $H_{MIN}$, where z-plane's poles and zeros are located inside the unit circle, from the channel (H) estimated by the channel estimator 41, and converts the inverse channel $H_{INV,MIN}$ of the minimum phase channel $H_{MIN}$ into a time-domain filter coefficient $h_{inv,min}$.

The inverse group delay filter coefficient generator 43 generates a time-domain filter coefficient $h_{inv,ap}$ having an inverse group delay component $G_{AP}^{-1}$ by using the estimated channel H and the minimum phase channel $H_{MIN}$. The combiner 44 generates an inverse channel of a receiving channel in the time domain by combining the filter coefficient $h_{inv,min}$ from the inverse minimum phase filter coefficient generator 42 and the filter coefficient $h_{inv,ap}$ from the inverse group delay filter coefficient generator 43.

The inverse minimum phase coefficient filter coefficient generator 42 includes a minimum phase channel generating unit 421, an inverse channel generating unit 422, and an inverse fast Fourier transform (IFFT) unit 423.

The inverse group delay filter coefficient generator 43 includes a division unit 431, a group delay calculating unit 432, and an inverse group delay coefficient generating unit 433.

The respective elements of the apparatus for estimating the inverse channel of the repeater's receiving channel in accordance with the embodiment of the present invention will be described below in detail.

The channel estimator 41 estimates the channel H established by a transmission path between the transmitter and the repeater from the received signal with the known signal such as the pilot signal or the training sequence being inserted. The estimated channel H includes a minimum phase component and an all-pass component as expressed in the following Equation 2.

MathFigure 2

$$H = [H(0) H(1) \ldots H(N-1)]^T \quad [\text{Math. 2}]$$
$$= \begin{bmatrix} H_{MIN}(0) \cdot H_{AP}(0) H_{MIN}(1) \cdot \\ H_{AP}(1) \ldots H_{MIN}(N-1) \cdot H_{AP}(N-1) \end{bmatrix}^T$$

Equation 2 can be rewritten as the following Equation 3.

MathFigure 3

$$H(i) = H_{MIN}(i) \cdot H_{AP}(i), i = 0, 1, \ldots, N-1 \quad [\text{Math. 3}]$$

where $H_{MIN}(i)$ represents the minimum phase component of the channel, and $H_{AP}(i)$ represents the all-pass component of the channel.

The minimum phase channel generating unit 421 receives the estimated channel H to generate the minimum phase channel $H_{MIN}$ in which the z-plane's poles and zeros are located inside the unit circle.

The inverse channel generating unit 422 generates the inverse channel $H_{INV,MIN}$ of the generated minimum phase channel $H_{MIN}$, based on the following Equation 4.

MathFigure 4

$$H_{INV,MIN} = [H_{INV,MIN}(0) H_{INV,MIN}(1) \ldots H_{INV,MIN}(N-1)]^T \quad [\text{Math. 4}]$$
$$= \left[ \frac{1}{H_{MIN}(0)} \frac{1}{H_{MIN}(1)} \ldots \frac{1}{H_{MIN}(N-1)} \right]^T$$

The inverse transformation using division can be achieved because the z-plane's poles and zeros in the generated minimum phase channel $H_{MIN}$, are located inside the unit circle, that is, because the stability and causality are ensured.

The IFFT unit 423 converts the inverse channel $H_{INV,MIN}$ of the frequency-domain minimum phase channel into the time-domain filter coefficient $h_{inv,min}$.

The division unit 431 generates the all-pass component $H_{AP}$ of the channel by dividing the estimated channel H by the generated minimum phase channel $H_{MIN}$, based on the following Equation 5.

MathFigure 5

$$H_{AP} = [H_{AP}(0) H_{AP}(1) \ldots H_{AP}(N-1)]^T \quad [\text{Math. 5}]$$
$$= \left[ \frac{H(0)}{H_{MIN}(0)} \frac{H(1)}{H_{MIN}(1)} \ldots \frac{H(N-1)}{H_{MIN}(N-1)} \right]^T$$

The group delay calculating unit 432 calculates the group delay component $G_{AP}$ from the phase information of the all-pass component $H_{AP}$ of the channel, based on the following Equation 6.

MathFigure 6

$$G_{AP}(\omega) = -\frac{d}{d\omega}\{\arg[H_{AP}(e^{j\omega})]\} \quad \text{[Math. 6]}$$

where
arg[·]
represents a phase response of an arbitrary system.

The inverse group delay coefficient generating unit 433 generates a time-domain filter coefficient $h_{inv,ap}$ having an inverse group delay component $G_{AP^{-1}}$ corresponding to a reciprocal of the calculated group delay component $G_{AP}$.

The combiner 44 generates a time-domain inverse channel of the receiving channel by combining the IFFT-ed filter coefficient $h_{inv,min}$, which is generated by the IFFT unit 423, and the time-domain filter coefficient $h_{inv,ap}$ having the inverse group delay component, which is generated by the inverse group delay coefficient generating 433, based on the following Equation 7.

MathFigure 7

$$h_{inv} = h_{inv,min} * h_{inv,ap} \quad \text{[Math.7]}$$

where * represents a convolution operation.

Figure 5:
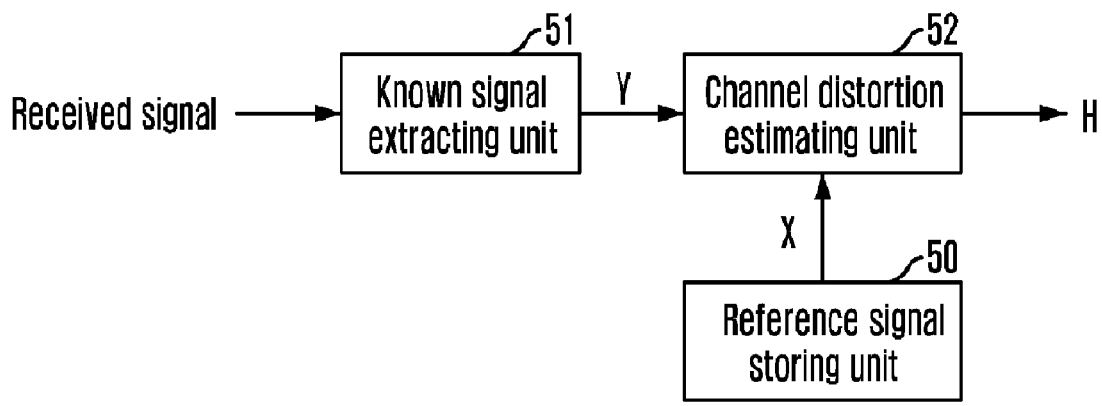
FIG. 5 is a block diagram of a channel estimator in the apparatus for estimating the inverse channel of the repeater's receiving channel in accordance with an embodiment of the present invention.

FIG. 5 is a block diagram of the channel estimator in the apparatus for estimating the inverse channel of the repeater's receiving channel in accordance with an embodiment of the present invention.

Referring to FIG. 5, the channel estimator includes a reference signal storing unit 50, a known signal extracting unit 51, and a channel distortion estimating unit 52. The reference signal storing unit 50 stores a reference signal X used for the distortion estimation of the receiving channel.

The known signal extracting unit 51 extracts a signal Y known to a transmitting side and a receiving side from the received signal. The channel distortion estimating unit 52 estimates the distortion of the receiving channel by comparing the known signal Y extracted by the known signal extracting unit 51 with the reference signal X stored in the reference signal storing unit 50.

The channel distortion estimating unit 52 estimates the distortion of the receiving channel, based on the following Equation 8.

MathFigure 8

$$H = [H(0)H(1) \ldots H(N-1)]^T \quad \text{[Math. 8]}$$
$$= \left[\frac{Y(0)}{X(0)} \frac{Y(1)}{X(1)} \ldots \frac{Y(N-1)}{X(N-1)}\right]^T$$

where $H(=[H(0)H(1)\ldots H(N-1)]^T)$ represents the estimated channel;

$X(=[X(0)X(1)\ldots X(N-1)]^T)$ represents the reference signal used for the distortion of the receiving channel; and $Y(=[Y(0)Y(1)\ldots Y(N-1)]^T)$ represents the pilot signal or training signal extracted from the received signal and known to the transmitting side and the receiving side.

Figure 6:
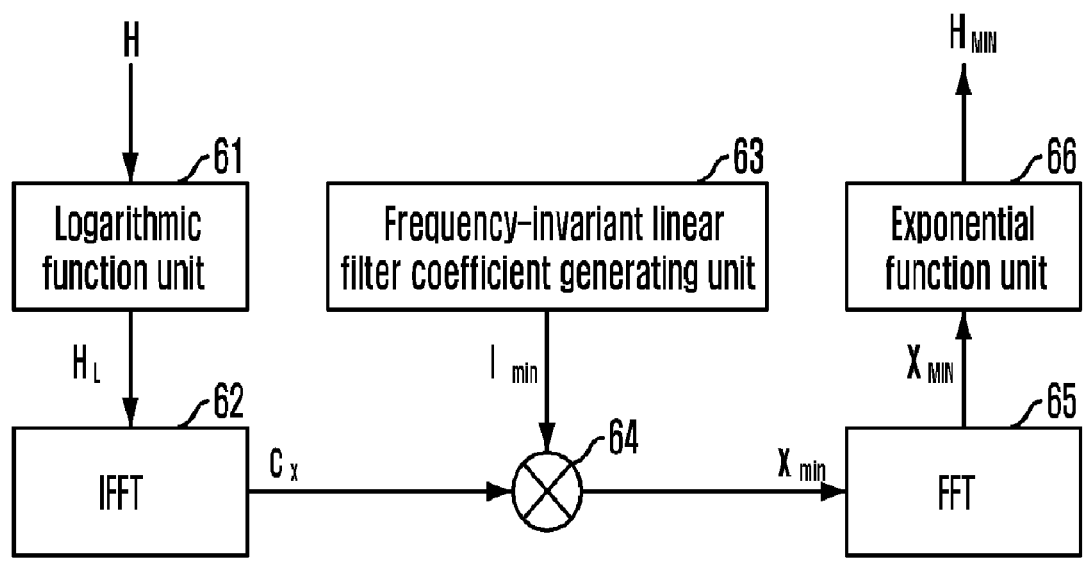
FIG. 6 is a block diagram showing a minimum phase channel generating unit in the apparatus for estimating the inverse channel of the repeater's receiving channel in accordance with an embodiment of the present invention.

FIG. 6 is a block diagram of the minimum phase channel generating unit in the apparatus for estimating the inverse channel of the repeater's receiving channel in accordance with an embodiment of the present invention.

Referring to FIG. 6, the minimum phase channel generating unit includes a logarithmic function unit 61, an IFFT unit 62, a frequency-invariant linear filter coefficient generating unit 63, a multiplication unit 64, an FFT unit 65, and an exponential function unit 66.

The respective elements of the minimum phase channel generating unit will be described below in more detail.

The logarithmic function unit (logarithmic transformation unit) 61 performs a logarithmic transformation on the channel H estimated by the channel estimator 41, based on the following Equation 9.

MathFigure 9

$$H_L = [H_L(0)H_L(1) \ldots H_L(N-1)]^T \quad \text{[Math. 9]}$$
$$= [\log|H_L(0)|\log|H_L(1)| \ldots \log|H_L(N-1)|]^T$$

where $H_L(=[H_L(0)H_L(1)\ldots H_L(N-1)]^T)$ represents the logarithmically converted channel.

The IFFT unit 62 converts the logarithmically converted channel $H_L$ into a time-domain coefficient $c_x$.

The frequency-invariant linear filter coefficient generating unit 63 generates a frequency-invariant linear filter coefficient expressed as the following Equation 10.

MathFigure 10

$$1_{min} = [1_{min}(0)1_{min}(1) \ldots 1_{min}(N-1)]^T \quad \text{[Math. 10]}$$
$$1_{min}(i) = \begin{cases} 1, & i = 0 \\ 2, & 1 \leq i < N/2 \\ 0, & N/2 \leq i < N-1 \end{cases}$$

The multiplication unit 64 multiplies the IFFT-ed coefficient $c_x$ from the IFFT unit 62 by the frequency-invariant linear filter coefficient $1_{min}$ the frequency-invariant linear filter coefficient generating unit 63, based on the following Equation 11.

MathFigure 11

$$X_{min} = [x_{min}(0)x_{min}(1) \ldots x_{min}(N-1)]^T \quad \text{[Math. 11]}$$
$$= \begin{bmatrix} c_x(0) \cdot 1_{min}(0)c_x(1) \cdot \\ 1_{min}(1) \ldots c_x(N-1) \cdot 1_{min}(N-1) \end{bmatrix}^T$$

where $x_{min}(=[x_{min}(0)x_{min}(1)\ldots x_{min}(N-1)]^T)$ represents a coefficient obtained by multiplying the IFFT-ed coefficient by the frequency-invariant linear filter coefficient.

The FFT unit 65 converts the coefficient $x_{min}$, output from the multiplication unit 64 into a frequency-domain coefficient $X_{min}$.

The exponential function unit (exponential transformation unit) 66 generates the minimum phase channel $H_{MIN}$ by performing an exponential transformation on the FFT-ed coefficient $X_{min}$, based on the following Equation 12.

MathFigure 12

$$H_{min} = [H_{MIN}(0) H_{MIN}(1) \ldots H_{MIN}(N-1)]^T \quad [\text{Math. 12}]$$
$$= [e^{X_{min}(0)} e^{X_{min}(1)} \ldots e^{X_{min}(N-1)}]^T$$

Figure 7:
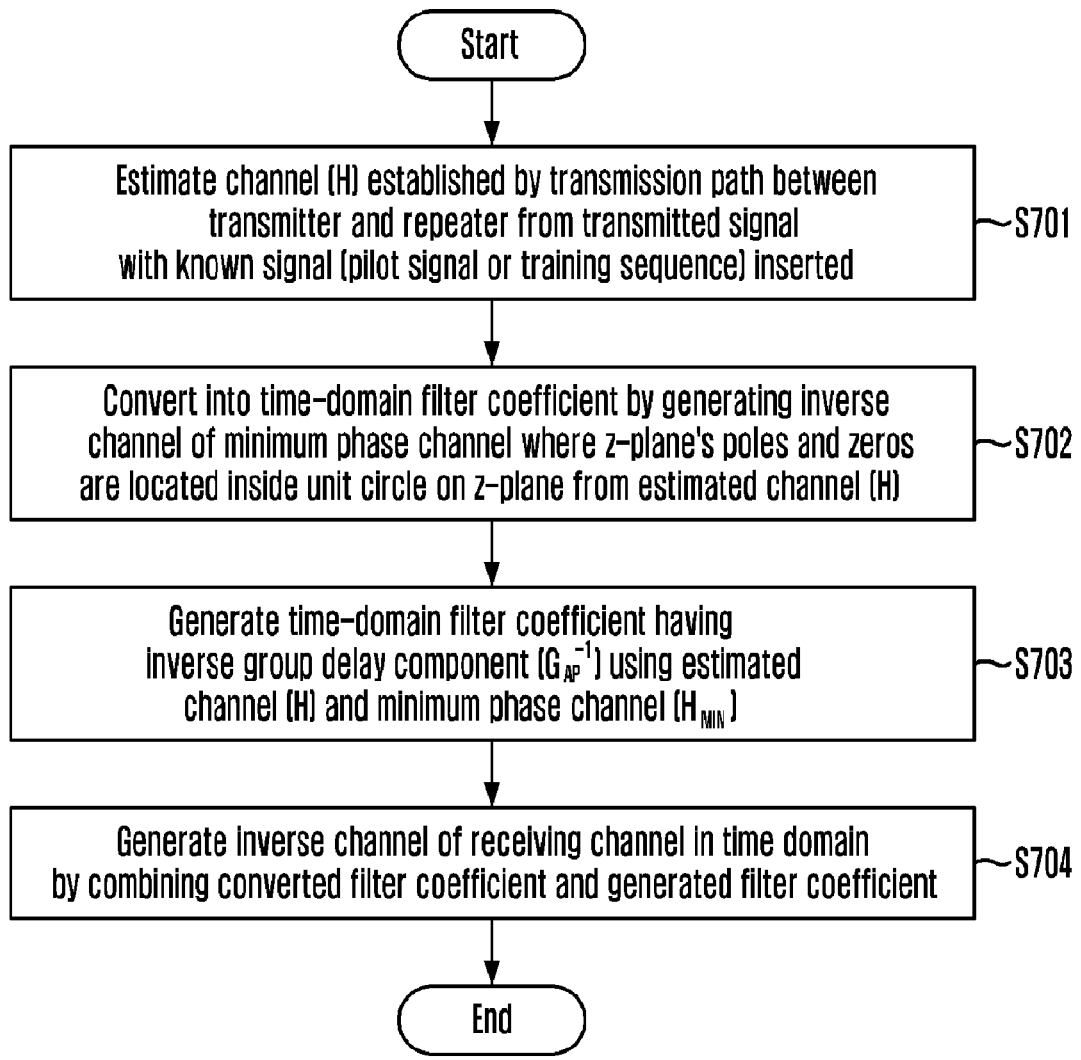
FIG. 7 is a flowchart illustrating a method for estimating an inverse channel of a repeater's receiving channel in accordance with an embodiment of the present invention.

FIG. 7 is a flowchart illustrating a method for estimating an inverse channel of a repeater's receiving channel in accordance with an embodiment of the present invention.

In operation S701, a channel H established by a transmission path between a transmitter and a repeater is estimated from a signal transmitted with a known signal such as a pilot signal or a training sequence being inserted.

In operation S702, an inverse channel $H_{INV,MIN}$ of a minimum phase channel $H_{MIN}$, where z-plane's poles and zeros are located inside the unit circle, is generated from the estimated channel (H) and is converted into a time-domain filter coefficient $h_{inv,min}$.

That is, the minimum phase channel $H_{MIN}$ where the z-plane's poles and zeros are located inside the unit circle is generated from the estimated channel H, and the inverse channel $H_{INV,MIN}$ is generated from the minimum phase channel $H_{MIN}$. Then, the frequency-domain inverse channel $H_{INV,MIN}$ of the minimum phase channel is converted into the time-domain filter coefficient $h_{inv,min}$.

In operation S703, a time-domain filter coefficient $h_{inv,ap}$ having an inverse group delay component $G_{AP^{-1}}$ is generated using the estimated channel H and the minimum phase channel $H_{MIN}$.

That is, an all-pass component $H_{AP}$ of the channel is generated by dividing the estimated channel H by the minimum phase channel $H_{MIN}$, and the group delay component $G_{AP}$ is calculated from phase information of the all-pass component $H_{AP}$ of the channel through differentiation. Then, the time-domain filter coefficient $h_{inv,ap}$ is generated which has an inverse group delay component $G_{AP^{-1}}$ corresponding to the reciprocal of the calculated group delay component $G_{AP}$.

In operation S704, an inverse channel of a receiving channel is generated in the time domain by combining the converted filter coefficient $h_{inv,min}$ and the generated filter coefficient $h_{inv,ap}$.

Although the apparatus for estimating the inverse channel of the repeater's receiving channel according to the present invention is adapted for broadcasting fields, such as ATSC, DVB, DMB and ISDB-T, and communication fields, such as Wibro and CDMA, the present invention is not limited thereto. The present invention can be applied to any environment requiring a typical repeater.

The methods for estimating the inverse channel of the repeater's receiving channel in accordance with the embodiments of the present invention can be realized as a program and stored in a computer-readable recording medium, such as CD-ROM, RAM, ROM, floppy disk, hard disk and magneto-optical disk. Since the process can be easily implemented by those skilled in the art of the present invention, further description will not be provided herein.

The present application contains subject matter related to Korean Patent Application No. 2007-0091034, filed in the Korean Intellectual Property Office on Sep. 7, 2007, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. An apparatus for estimating an inverse channel, the apparatus comprising:
   a channel estimator for estimating a channel established by a transmission path from a received signal with a known signal being inserted;
   an inverse minimum phase filter coefficient generator for generating an inverse channel of a minimum phase channel from the channel estimated by the channel estimator, and converting the inverse channel of the minimum phase channel into a time-domain filter coefficient;
   an inverse group delay filter coefficient generator for generating a time-domain filter coefficient having an inverse group delay component by using the estimated channel and the minimum phase channel; and
   a combiner for generating an inverse channel of a receiving channel in a time domain by combining the filter coefficient converted from the inverse minimum phase filter coefficient generator and the filter coefficient generated from the inverse group delay filter coefficient generator.

2. The apparatus of claim 1, wherein the inverse minimum phase coefficient filter coefficient generator comprises:
   a minimum phase channel generating unit for receiving the channel estimated by the channel estimator to generate the minimum phase channel in which z-plane's poles and zeros are located inside a unit circle;
   an inverse channel generating unit for generating the inverse channel of the minimum phase channel generated by the minimum phase channel generating unit; and
   an inverse fast Fourier transform (IFFT) unit for converting a frequency-domain inverse channel of the minimum phase channel from the inverse channel generating unit into the time-domain filter coefficient.

3. The apparatus of claim 2, wherein the minimum phase channel generating unit comprises:
   a logarithmic transformation unit for performing a logarithmic transformation on the channel estimated by the channel estimator;
   a second IFFT unit for converting the channel transformed by the logarithmic transformation unit into a time-domain coefficient;
   a linear filter coefficient generating unit for generating a frequency-invariant linear filter coefficient;
   a multiplication unit for multiplying the coefficient converted by the IFFT unit by the frequency-invariant linear filter coefficient generated from the linear filter coefficient generating unit;
   an FFT unit for converting the coefficient output from the multiplication unit into a frequency-domain coefficient; and
   an exponential transformation unit for generating the minimum phase channel by performing an exponential transformation on the coefficient converted by the FFT unit.

4. The apparatus of claim 1, wherein the inverse group delay filter coefficient generator comprises:
   an all-pass component generating unit for generating an all-pass component of the channel by dividing the estimated channel by the minimum phase channel;
   a group delay calculating unit for calculating the group delay component from phase information of the all-pass component of the channel, which is generated by the all-pass component generating unit; and an inverse group delay coefficient generating unit for generating a time-domain filter coefficient having an inverse group delay component corresponding to a reciprocal of the group delay component calculated by the group delay calculating unit.

5. The apparatus of claim 4, wherein the channel estimator comprises:
a reference signal storing unit for storing a reference signal used to estimate distortion of the receiving channel;
an extracting unit for extracting a distortion estimation signal from the received signal; and
a channel distortion estimating unit for estimating the distortion of the receiving channel by comparing the distortion estimation signal extracted by the distortion estimation signal with the reference signal stored in the reference signal storing unit.

6. The apparatus of claim 4, wherein the known signal comprises a pilot signal or a training sequence.

7. A method for estimating an inverse channel, the method comprising:
estimating a channel established by a transmission path from a received signal with a known signal being inserted;
generating an inverse channel of a minimum phase channel from the estimated channel, and converting the inverse channel of the minimum phase channel into a time-domain filter coefficient;
generating a time-domain filter coefficient having an inverse group delay component by using the estimated channel and the minimum phase channel; and
generating an inverse channel of a receiving channel in a time domain by combining the converted filter coefficient and the generated filter coefficient.

8. The method of claim 7, wherein said generating of the inverse channel of the minimum phase channel comprises:
generating the minimum phase channel, where z-plane's poles and zeros are located inside a unit circle, from the estimated channel;
generating the inverse channel of the generated minimum phase channel; and
converting the generated frequency-domain inverse channel of the minimum phase channel into the time-domain filter coefficient.

9. The method of claim 8, wherein said generating of the minimum phase channel comprises:
performing a logarithmic transformation on the estimated channel;
converting the logarithmic-transformed channel into a time-domain coefficient;
generating a frequency-invariant linear filter coefficient;
multiplying the converted time-domain coefficient by the generated frequency-invariant linear filter coefficient;
converting the multiplication result into a frequency-domain coefficient; and
generating the minimum phase channel by performing an exponential transformation on the converted frequency-domain coefficient.

10. The method of claim 7, wherein said generating of the time-domain filter coefficient comprises:
generating an all-pass component of the channel by dividing the estimated channel by the minimum phase channel;
calculating the group delay component from phase information of the all-pass component of the channel; and
generating a time-domain filter coefficient having an inverse group delay component corresponding to a reciprocal of the calculated group delay component.

11. The method of claim 10, wherein said estimating of the channel comprises:
storing a reference signal used to estimate distortion of the receiving channel;
extracting a distortion estimation signal from the received signal; and
estimating distortion of the receiving channel by comparing the extracted distortion estimation signal with the stored reference signal.

12. The method of claim 10, wherein the known signal comprises a pilot signal or a training sequence.

* * * * *